(12) United States Patent
Ota (10) Patent No.: US 12,298,620 B2
(45) Date of Patent: May 13, 2025

(54) DISPLAY APPARATUS (71) Applicant: Japan Display Inc., Tokyo (JP)

(72) Inventor: Takashi Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/363,826

(22) Filed: Aug. 2, 2023

(65) Prior Publication Data

US 2023/0375876 A1  Nov. 23, 2023

Related U.S. Application Data (63) Continuation of application No. PCT/JP2021/044266, filed on Dec. 2, 2021.

(30) Foreign Application Priority Data

Feb. 5, 2021 (JP) ................... 2021-017224

(51) Int. Cl.
*G02F 1/13357* (2006.01)
*F21V 8/00* (2006.01)
*G02F 1/1335* (2006.01)

(52) U.S. Cl.
CPC ..... *G02F 1/133603* (2013.01); *G02B 6/0073* (2013.01); *G02F 1/133607* (2021.01)

(58) Field of Classification Search
CPC ........ G02F 1/133603; G02F 1/133607; H10K 50/85; H10K 50/854
See application file for complete search history.

(56) References Cited

U.S. PATENT DOCUMENTS

2001/0050736 A1* 12/2001 Lee .................. G02B 6/0051
349/65
2017/0176668 A1* 6/2017 Itou .................. G02F 1/134309
2019/0094616 A1 3/2019 Kim et al.
(Continued)

FOREIGN PATENT DOCUMENTS

CN 203375353 U * 1/2014
CN 208013621 U * 10/2018
JP 2004-038009 A 2/2004
(Continued)

OTHER PUBLICATIONS

International Search Report mailed on Mar. 1, 2022 for the corresponding PCT Application No. PCT/JP2021/044266, with English machine translation.
(Continued)

*Primary Examiner* — Jessica M Merlin
(74) *Attorney, Agent, or Firm* — Michael Best & Friedrich LLP (57) ABSTRACT An object of the present invention is to provide a high-definition and high-contrast display apparatus using accurate local dimming. In achieving the object of the invention, there is provided a display apparatus including a display panel and a backlight. The backlight has a light source and an optical sheet. The light source has a light source substrate and LEDs arranged on the light source substrate. The light source is divided into segments in planar view. The segments include at least one LED each. The light source substrate and the LEDs are covered with a transparent resin. The transparent resin is overlaid with a sheet having a honeycomb partition.

5 Claims, 11 Drawing Sheets (56) References Cited

U.S. PATENT DOCUMENTS

2020/0133067 A1    4/2020   Chiang

FOREIGN PATENT DOCUMENTS

| JP | 2010-169805 A  | 8/2010 |
| JP | 2010-169805 A1 | 8/2010 |
| JP | 2017-116683 A  | 6/2017 |
| JP | 3221290 U      | 5/2019 |
| TW | M564177 U      | 7/2018 |

OTHER PUBLICATIONS

Japanese Office Action dated Feb. 12, 2025, for the corresponding Japanese Application No. 2021-017224, with English machine translation.

* cited by examiner

DISPLAY APPARATUS

CLAIM OF PRIORITY

The present application is a continuation application of International application No. PCT/JP2021/044266 filed on Dec. 2, 2021, which claims priority to Japanese Patent Application No. 2021-017224 filed on Feb. 5, 2021. The contents of these applications are incorporated herein by reference in their entirety.

BACKGROUND OF THE INVENTION

1. Field of the Invention

The present invention relates to a display apparatus with a backlight. More particularly, the invention relates to a display apparatus that provides a high-contrast screen using local dimming.

2. Description of the Related Art

In a liquid crystal display apparatus, a thin-film transistor (TFT) substrate and a counter substrate are arranged opposite to each other to sandwich a liquid crystal layer therebetween, the TFT substrate having pixel electrodes and TFTs formed thereon in a matrix pattern. An image is formed by controlling light transmittance through liquid crystal molecules for each pixel.

An organic electroluminescence (EL) display apparatus, on the other hand, has pixels formed in a matrix pattern and equipped each with a light-emitting element, a driving TFT, a switching TFT, and the like in an organic EL layer. An image is formed by controlling the luminous intensity of the organic EL layer for each pixel. Constituted by self-luminous elements, the organic EL display apparatus provides excellent image contrast.

However, the liquid crystal display apparatus with its smaller pixel size offers higher definition than the organic EL display apparatus. Local dimming has thus been developed as a method of improving the contrast of the liquid crystal display apparatus. For example, Japanese patent application laid open No. 2017-116683 discloses related art of local dimming.

SUMMARY OF THE INVENTION

Virtual-reality (VR) and medical-use display apparatuses require higher-definition and higher-contrast images. In the case where such display apparatuses adopt local dimming, the local dimming feature needs to be controlled in a more minute manner.

If it is desired that such display apparatuses perform local dimming more effectively and thereby improve contrast, the area of segments as units of local dimming needs to be reduced, for example, in such a manner that the light of each segment will not affect the adjacent segments.

Reducing the area of the segments makes it difficult to arrange multiple light-emitting diodes (LEDs) in each segment. On the other hand, arranging only one LED in each segment detracts from the uniformity of luminance distribution, which poses the problem of letting LEDs be viewed from the screen side. Placing diffusion sheets, for example, to counter this problem raises another problem: the diffusion sheets cause the light of each segment to leak to the adjacent segments.

It is therefore an object of the present invention to overcome the above and other deficiencies of the related art and to provide a display apparatus having a backlight and effectively performing local dimming in a manner offering a high-definition and high-contrast screen.

In solving the foregoing and other problems of the related art, the following principal means are specifically provided:

(1) There is provided a display apparatus including a display panel and a backlight. The backlight has a light source and an optical sheet. The light source has a light source substrate and LEDs arranged on the light source substrate. The light source is divided into segments in planar view. The segments include at least one LED each. The light source substrate and the LEDs are covered with a transparent resin. The transparent resin is overlaid with a sheet having a honeycomb partition.

(2) There is also provided a display apparatus including a display panel and a backlight. The backlight has a light source and an optical sheet group. The light source has a light source substrate and LEDs arranged on the light source substrate. The light source is divided into segments in planar view. The segments include at least one LED each. The light source substrate and the LEDs are covered with a transparent resin. A honeycomb partition is formed within the transparent resin over a light-emitting surface of the LEDs.

DETAILED DESCRIPTION OF THE PREFERRED EMBODIMENTS

The present invention will now be described below in detail using embodiments.

Embodiment 1

Figure 1:
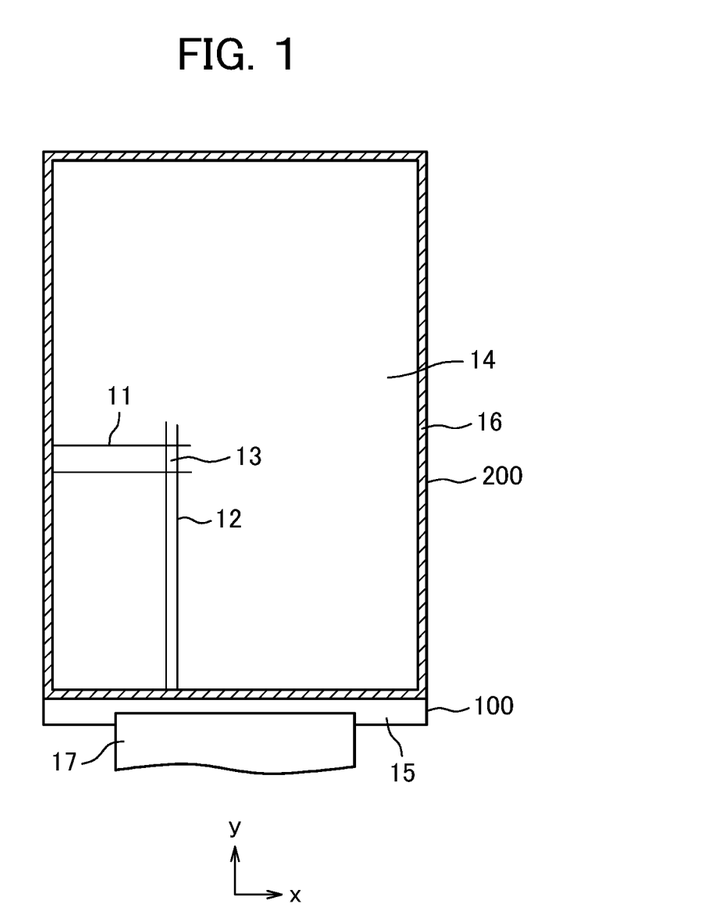
FIG. 1 is a plan view of a liquid crystal display apparatus.

FIG. 1 is a plan view depicting an exemplary liquid crystal display apparatus. In FIG. 1, a TFT substrate 100 and a counter substrate 200 are bonded together using a seal material 16 to seal liquid crystal therebetween. A display region 14 is formed over a portion where the TFT substrate 100 and the counter substrate 200 overlap with each other. The display region 14 has scanning lines 11 extended horizontally (in x-direction) and arrayed vertically (in y-direction). The display region 14 also has video signal lines 12 extended vertically and arrayed horizontally. Pixels 13 are formed in regions enclosed by the scanning lines 11 and the video signal lines 12.

In FIG. 1, a portion where the TFT substrate 100 and the counter substrate 200 do not overlap with each other constitutes a terminal region 15. The terminal region 15 is connected with a flexible wiring substrate 17 that supplies power and signals to a liquid crystal display panel. A driver integrated circuit (IC) 17 for driving the liquid crystal display panel is mounted on the flexible wiring substrate 17. At the back of the TFTs is a backlight as depicted in FIG. 2.

Figure 2:
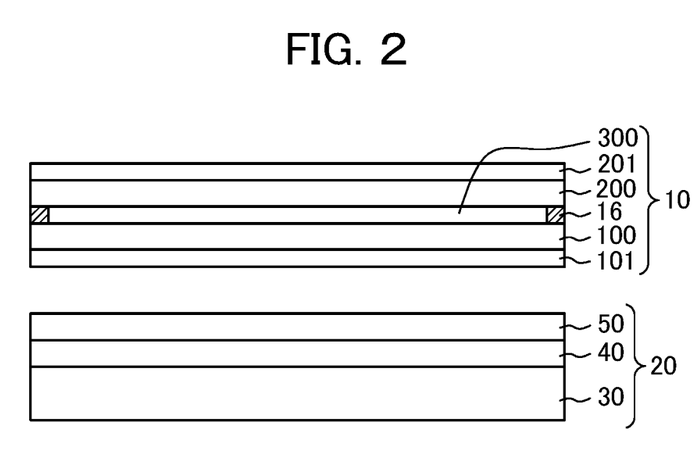
FIG. 2 is a cross-sectional view of the liquid crystal display apparatus.

FIG. 2 is a cross-sectional view of the liquid crystal display apparatus. In FIG. 2, a backlight 20 is arranged at the back of a liquid crystal display panel 10. The liquid crystal display panel 10 is configured as follows: The counter substrate 200 with a black matrix and color filters formed thereon is arranged opposite to the TFT substrate 100 having pixel electrodes, common electrodes, TFTs, scanning lines, and video signal lines formed thereon. The TFT substrate 100 and the counter substrate 200 are bonded together at their peripherals using the seal material 16 to seal liquid crystal 300 therebetween.

Liquid crystal molecules are initially aligned by alignment films formed on the TFT substrate 100 and counter substrate 200. Applying a voltage between the pixel electrodes and the common electrodes rotates the liquid crystal molecules in a manner controlling per pixel the light from the backlight 20 to form an image. The liquid crystal 300 can control only polarized light. For this reason, a lower polarizing plate 101 is arranged under the TFT substrate 100 to let only the polarized light enter the liquid crystal 300. The light modulated by the liquid crystal 300 is detected by an upper polarizing plate 201 for visualization of images.

In FIG. 2, the backlight 20 is arranged at the back of the liquid crystal display panel 10. The backlight 20 is configured with a prism sheet 50 placed on a diffusion sheet group 40 formed of multiple diffusion sheets on top of light sources 30. There are two types of backlight: a side-light backlight with the light sources such as LEDs arranged on the sides of a light-guide plate, and a direct backlight with the light sources such as LEDs placed under a light-guide plate. The present invention adopts the direct backlight.

White LEDs are used in the case of FIG. 2. In a case where blue LEDs are adopted, the diffusion sheets may be supplemented with a color conversion sheet having a fluorescent substance dispersed within a plastic resin sheet. In order to improve the utilization efficiency of light from the backlight 20, a deflection/reflection sheet may also be used. The types of optical sheets to be used and the number of optical sheets to be utilized are determined depending on the display apparatus of interest.

In the case where an image is displayed on the liquid crystal display apparatus, a bright portion of the image is formed by allowing backlight to pass through and a dark portion is given by blocking backlight. The contrast of the image is defined by the ratio of the bright portion to the dark portion. The liquid crystal display apparatus forms the dark portion by causing the liquid crystal to block light from the backlight. However, the liquid crystal does not completely block the backlight; there are some leaks of light. The light leakage causes the contrast to drop.

Figure 3:
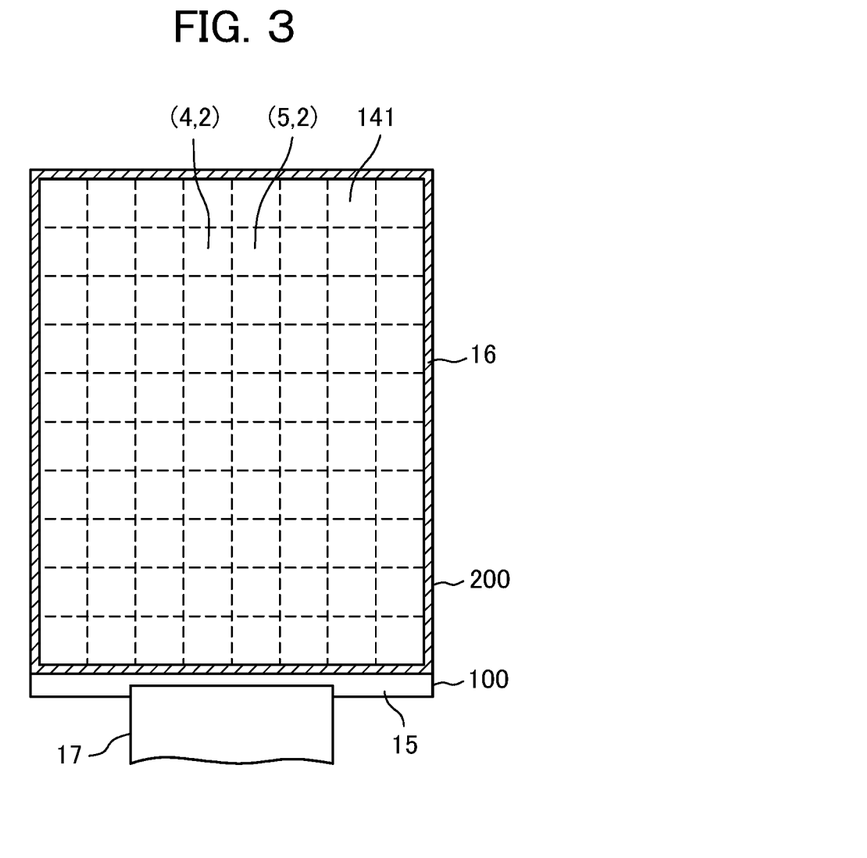
FIG. 3 is a plan view of the liquid crystal display apparatus with segments intended for local dimming operations.

Local dimming involves enabling deep-black display by not emitting backlight to the dark portion, which provides high contrast. FIG. 3 depicts an exemplary liquid crystal display apparatus configured to implement local dimming. FIG. 3 is a plan view of the liquid crystal display apparatus of which the configuration is similar to that explained with reference to FIG. 1. In FIG. 3, the display region 14 is divided into segments 141. Although the dotted lines in FIG. 3 denote the borders of the segments 141, these borders are indicated only for purpose of explanation and do not actually exist in the liquid crystal display panel. The light sources in the backlight are positioned in a manner corresponding to the segments.

In FIG. 3, it is assumed that a segment (4, 2) is a bright portion and a segment (5, 2) is a dark portion. Under local dimming, the light source, i.e., an LED, of the segment (4, 2) is turned on and the light source of the segment (5, 2) is turned off. This causes the black produced in the segment (5, 2) to give deep black display, which enables high contrast.

However, since there are no actual borders between the segments, the light of the segment (4, 2) can affect the segment (5, 2) depending on the luminance distribution of the segments. This means that the segment (5, 2), which is supposed to give black display, is also illuminated by backlight. This may cancel out the effect of local dimming.

Figure 4:
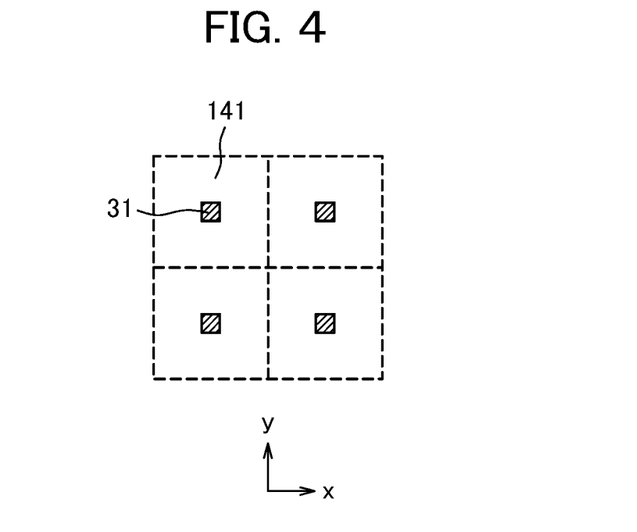
FIG. 4 is a plan view of a comparative example 1.
Figure 5:
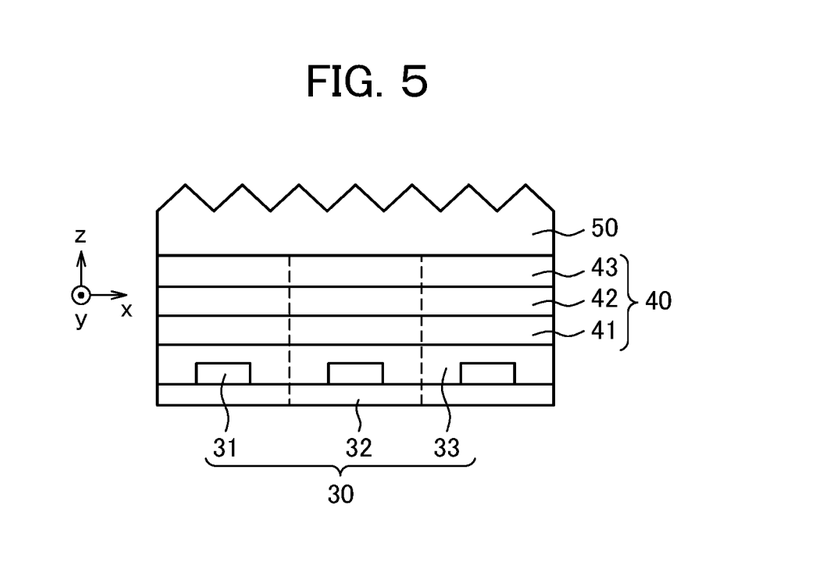
FIG. 5 is a cross-sectional view of the comparative example 1.

FIGS. 4 and 5 depict a comparative example 1 indicative of a backlight configuration that enables local dimming. White LEDs 31 are used as the light sources. FIG. 4 is a plan view depicting the arrangement of the LEDs 31 as the light sources of the segments 141 in the backlight. The segments 141 are divided by dotted lines in FIG. 4. However, the dotted lines are only for purpose of explanation and do not actually constitute the partition.

The size of each segment is 4 millimeters (mm) per side at most. In the case of FIG. 5, for example, each segment measures 2 mm per side. The size of each segment 141 is also similar in the ensuing examples. In FIG. 4, one LED 31 is arranged in each segment 141. The size of the segment may alternatively be defined as a center-to-center distance between adjacent LEDs in the x-direction and y-direction. In a case where multiple LEDs 31 are arranged in each segment, a weighted average may be taken of the positions of the LEDs 31.

FIG. 5 is a cross-sectional view of the comparative example 1. In FIG. 5, a transparent resin 33 is formed to cover the LEDs 31 arranged on a light source substrate 32. White LEDs are used as the LEDs 31. An acrylic resin or a silicone resin, for example, is used as the transparent resin 33. The transparent resin 33 is provided to protect the LEDs 31 as well as the electrodes and wiring formed on the light source substrate 32. The dotted lines on the light source substrate 32 in FIG. 5 are given for the purpose of indicating the borders of the segments.

The diffusion sheet group 40 made up of three diffusion sheets 41, 42, and 43 is arranged over the transparent resin 33. The diffusion sheets are designed to even out the light from the light sources. As such, there may be one or more than three diffusion sheets as needed. The diffusion sheets are 0.1 mm thick each, for example.

The prism sheet 50 is arranged over the diffusion sheet 43. In FIG. 5, the prism sheet 50 is extended in the y-direction. Linear prisms with a triangular cross-section each are arrayed, for example, at a pitch of 50 microns in the x-direction. The prism sheet 50 in FIG. 5 acts to orient in the z-axis direction the light that tends to diffuse in the x-direction. The prism sheet 50 has a total thickness of approximately 120 microns, i.e., 50 microns being the thickness of the prism array portion (prism height) and 70 microns being the thickness of the substrate portion. In order to orient in the z-axis direction the light inclined to diffuse in the y-direction, the prism sheet 50 may be overlaid with another prism sheet extending in the x-direction and having linear prisms with a triangular cross-section arrayed in the y-direction.

Figure 6:
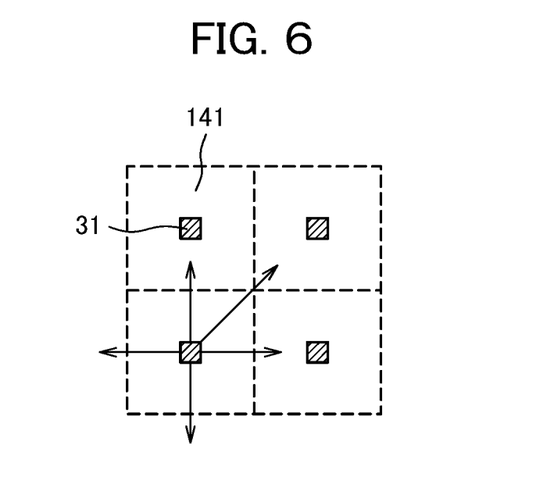
FIG. 6 is a plan view depicting the problem with the comparative example 1.

The problem with the comparative example 1 is that the light from the LED 31 of a given segment leaks to the adjacent segments via the transparent resin 33 and the diffusion sheet group 40. FIG. 6 is a plan view illustrating this problem. The arrangements of the segments 141 and LEDs 31 are the same as those in FIG. 4. The arrows in FIG. 6 denote the light emitted from the LED 31. FIG. 6 indicates that the light from the LED 31 not only fills the own segment but also leaks to the adjacent segments as designated by the arrows.

Figure 7:
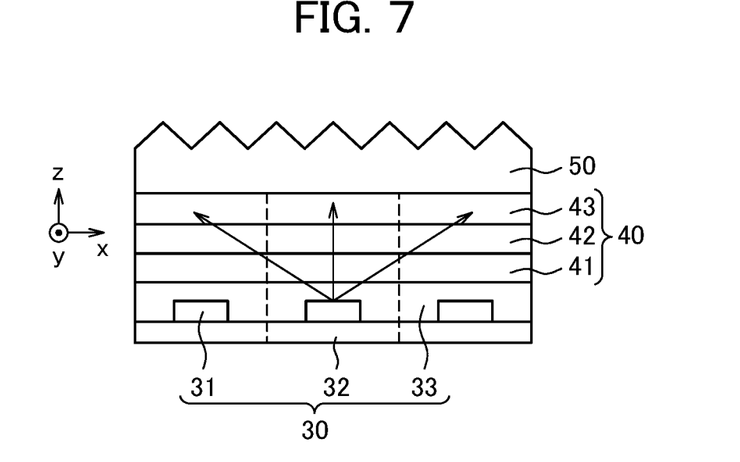
FIG. 7 is a cross-sectional view depicting the problem with the comparative example 1.

FIG. 7 is a cross-sectional view illustrating this problem. The configuration in FIG. 7 is similar to that explained with reference to FIG. 5. The arrows in FIG. 7 denote the light emitted from an LED 31. It is indicated that the light heading in oblique directions leaks to the adjacent segments. This makes it difficult to provide accurate or effective local dimming.

Figure 8:
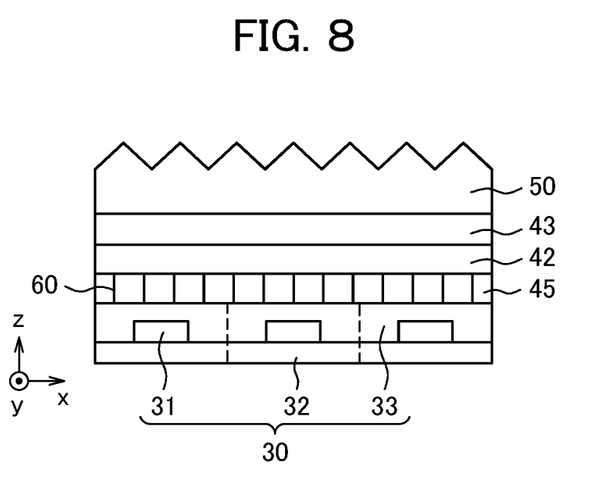
FIG. 8 is a cross-sectional view of an embodiment 1.

FIG. 8 is a cross-sectional view of an embodiment 1 designed to counter this problem. The basic configuration in FIG. 5 is the same as that in FIG. 5. What makes the configuration in FIG. 8 different from that in FIG. 5 is that a honeycomb-shaped partition 60 is formed in a first diffusion sheet. In the description that follows, the first diffusion sheet with the honeycomb partition 60 formed therein may be referred to as the honeycomb diffusion sheet 45. In FIG. 8, the honeycomb partition 60 prevents the light from the LEDs 31 from leaking to the adjacent segments.

Figure 9:
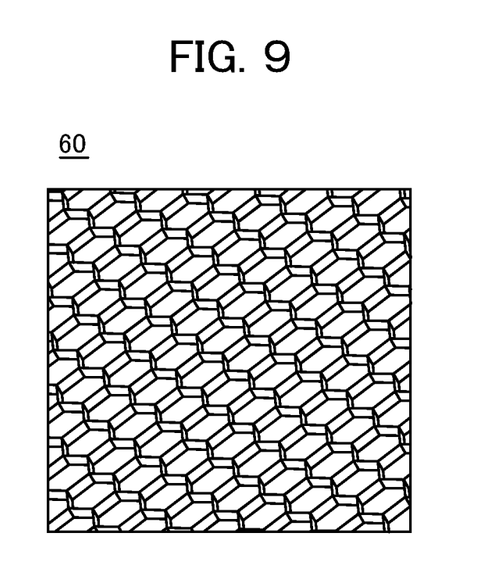
FIG. 9 is a perspective view of a honeycomb partition.

FIG. 9 is a perspective view of the honeycomb partition 60. That is, grids of a hexagonal planar shape each are formed in a matrix pattern. For example, the honeycomb partition 60 may be formed of a black silicone resin. The honeycomb partition 60 may be manufactured, for example, by etching a black silicone resin with a thickness of 0.1 mm to form small hexagonal holes therein in matrix. The honeycomb partition wall is 0.05 mm thick, for example.

Thereafter, the honeycomb holes formed in matrix are filled with the resin that makes up the diffusion sheet. This is how the honeycomb diffusion sheet 45 is formed. In most cases, polyethylene terephthalate (PET) is used as the material of the diffusion sheet. In some cases, polycarbonate (PC) or silicone resin may be utilized instead. A large mother sheet may be first formed and cut into the individual honeycomb diffusion sheets 45 to match the display size.

Figure 10:
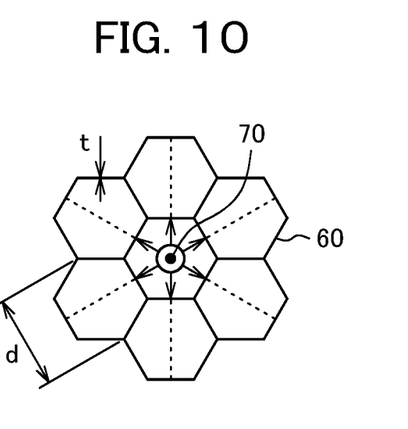
FIG. 10 is a plan view of the honeycomb partition.

FIG. 10 is a plan view of the honeycomb partition 60. The wall thickness of the honeycomb partition 60 is 0.05 mm, for example. A maximum diameter "d" of each honeycomb is larger than the diameter of each pixel formed in the liquid crystal display panel and smaller than the diameter of each segment. In the description that follows, the honeycomb diameter refers to the maximum diameter "d" unless otherwise noted. As will be explained later, the size of each honeycomb may be changed as needed according to usage. In FIG. 10, a dot at the center of a honeycomb indicates a point light source 70, for example. Although light emanates from the point light source 70 in all directions, the honeycomb partition 60 prevents the emitted light from entering the other honeycombs. This obviously prevents the light from the point light source from affecting the adjacent segments.

Figure 11:
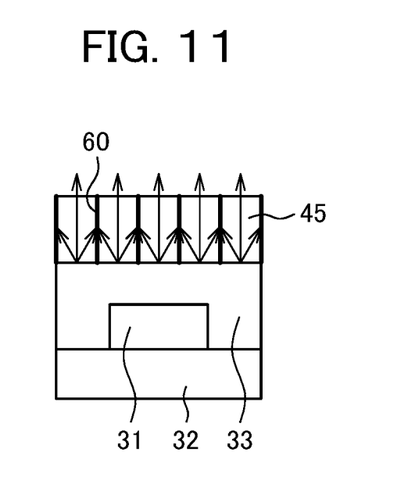
FIG. 11 is a cross-sectional view depicting the operating principle of the embodiment 1.

FIG. 11 is a cross-sectional view depicting how things work. In FIG. 11, the honeycomb diffusions sheet 45 is arranged over the transparent resin 33 covering the LED 31. The light from the LED 31 constitutes the point light source in each honeycomb. The light spreading from the point light source in all directions is blocked by the honeycomb partition 60; only the light heading upward is emitted from the honeycomb diffusions sheet 45. This naturally prevents the light from leaking to the adjacent segments.

Figure 12:
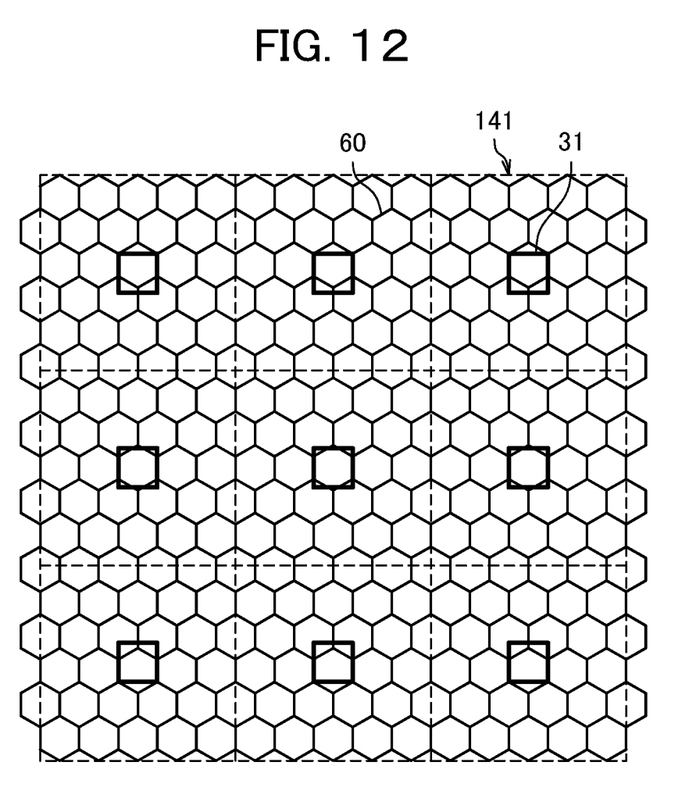
FIG. 12 is a plan view depicting the relations between the honeycomb partition and LEDs.

FIG. 12 is a plan view depicting how the arrangement in FIG. 11 looks like when viewed from above. In FIG. 12, dotted lines are virtual lines indicative of the borders of the segments 141. At the center of each segment 141 is the LED 31. In FIG. 12, the honeycomb partition 60 is formed in a manner covering each segment 141. The honeycomb partition 60 is arranged between the light sources 30 including the LEDs 31 on one hand and the liquid crystal display panel 10 on the other hand. In a common optical configuration, the accuracy with which to assemble the LEDs 31 and the liquid crystal display panel 10 becomes a problem. However, the honeycomb partition 60 has a close-packed structure in which the honeycombs are uniformly distributed in all directions. Using the honeycomb partition 60 therefore makes it possible to implement a liquid crystal display apparatus unaffected by the assembly accuracy and always offering uniform characteristics.

The honeycomb partition 60 offers excellent characteristics as described above but may pose some problem when examined microscopically. In FIG. 12, for example, the effects of the honeycomb wall with respect to one LED differ in the first, second, and third rows from above. Since the honeycomb wall is black and does not let light pass through, the quantity of the light emanating from the LEDs may differ from one row to another.

Figure 13:
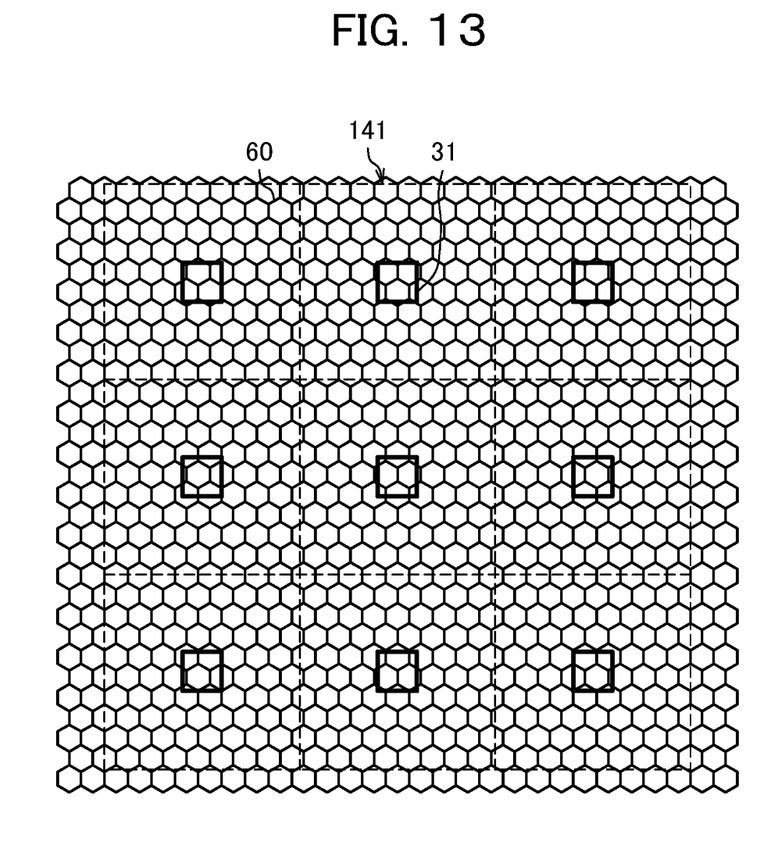
FIG. 13 is another plan view depicting the relations between the honeycomb partition and LEDs.

This problem can be alleviated by reducing the pitch of the honeycombs. FIG. 13 is a plan view of the case where the honeycomb pitch is made smaller than that in FIG. 12. Whereas the honeycombs corresponding to the LEDs 31 in FIG. 13 are arranged differently in the first, second, and third rows from above, the unevenness is less pronounced than that in FIG. 12. That is, the effects of the honeycomb wall in FIG. 13 are made more uniform than in FIG. 12.

As depicted in FIG. 13, making the honeycomb pitch smaller can alleviate the unevenness of luminance from one segment to another. However, reducing the honeycomb pitch diminishes light transmissivity as a whole. Thus, the degree of the honeycomb pitch is determined by a trade-off between the uniformity of light among the segments on one hand and the light transmissivity of the entire backlight on the other hand.

The LEDs 31 in FIGS. 12 and 13 may be defined as light-emitting windows for the LED light. The honeycomb diameter may also be defined by the relation with the diameter of the LED light-emitting window. That is, the honeycomb diameter may be defined to be large when the honeycomb diameter is larger than the diameter of the LED light-emitting window and defined to be small when the honeycomb diameter is smaller than the LED light-emitting window diameter. In the case where the LED light-emitting window has long and short diameters, the long diameter of the light-emitting widow may be defined to be the diameter thereof.

The honeycombs, being black in color, may give rise to the problem of moiré in connection with light transmissivity. Still, the moiré problem is negligible compared with the case where the partition is rectangular or shaped otherwise. As a countermeasure against the moiré problem, the honeycomb partition 60 may be rotated relative to the liquid crystal display panel. The effects of the rotation of the honeycomb partition 60 are also inconsequential compared with the case of the partition being shaped other than hexagonal.

Embodiment 2

Figure 14:
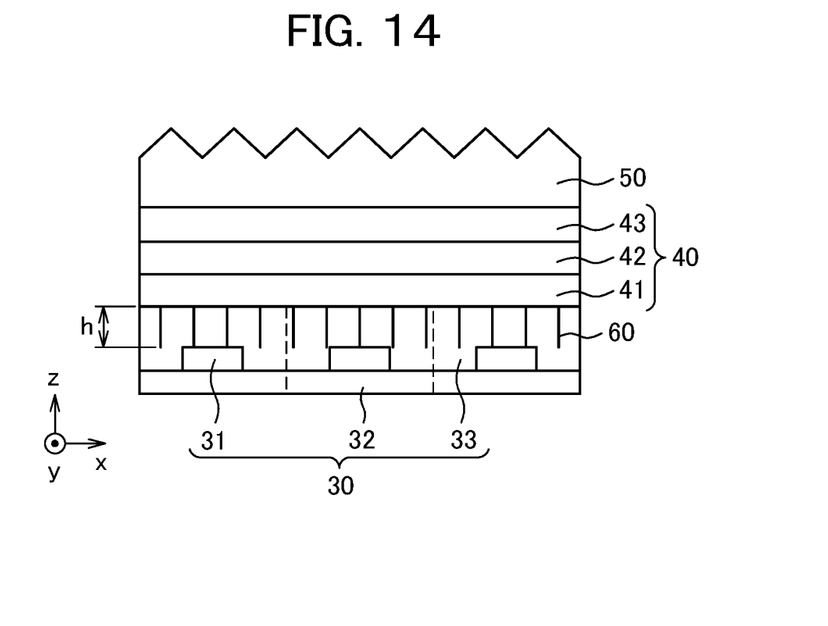
FIG. 14 is a cross-sectional view of an embodiment 2.

FIG. 14 is a cross-sectional view depicting the configuration of an embodiment 2. What makes the configuration in FIG. 14 different from that in FIG. 5 is that the honeycomb partition 60 is formed within the transparent resin 33 covering the LEDs 31. As explained above in connection with the embodiment 1, forming the honeycomb partition 60 prevents the light from the light sources from entering the adjacent segments in the embodiment 2. What is noteworthy of the embodiment 2 is that the honeycomb partition 60 formed directly above the LEDs 31 reinforces the advantageous effects.

In FIG. 14, the height "h" of the honeycomb partition 60 is between 0.1 and 0.2 mm. As with the embodiment 1, the honeycomb partition 60 may be formed of a black silicone resin. The method of manufacturing the honeycomb partition 60 is similar to that explained with reference to FIG. 9 in connection with the embodiment 1.

The honeycomb partition 60 as illustrated in FIG. 9 is arranged over the LED array. The honeycombs are then filled with an acrylic resin or silicone resin making up the transparent resin 33 that is allowed to harden. If it is difficult to place on the LED array the honeycomb partition 60, which is mechanically unstable, the clearances between the LEDs 31 may be first filled with the transparent resin 33 that is then allowed to harden and planarized. Thereafter, the honeycomb partition 60 may be placed over the planarized transparent resin 33 and the honeycombs may be filled with the transparent resin 33 that is allowed to harden.

The honeycomb partition 60, being black in color, may pose a danger of affecting the uniformity of light. In the embodiment 2, three diffusion sheets 41, 42, and 43 serve to diffuse light. This allows the honeycomb partition 60 to affect less the uniformity of light than in the case of the embodiment 1.

Figure 15:
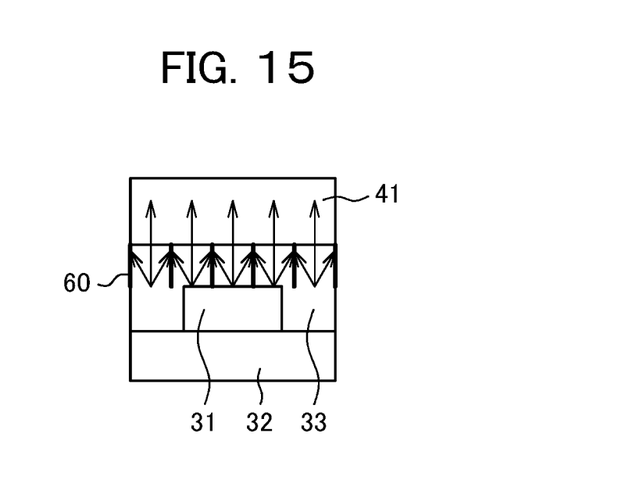
FIG. 15 is a cross-sectional view depicting the operating principle of the embodiment 2.

FIG. 15 is a cross-sectional view depicting the operating principle of the embodiment 2. The light incident on each of the honeycombs becomes a point light source inside each honeycomb. The light spreading from the point light source in all directions is blocked by the honeycomb partition 60; only the light heading upward is emitted from the honeycomb partition 60. This obviously prevents the light from leaking to the adjacent segments as well.

Figure 16:
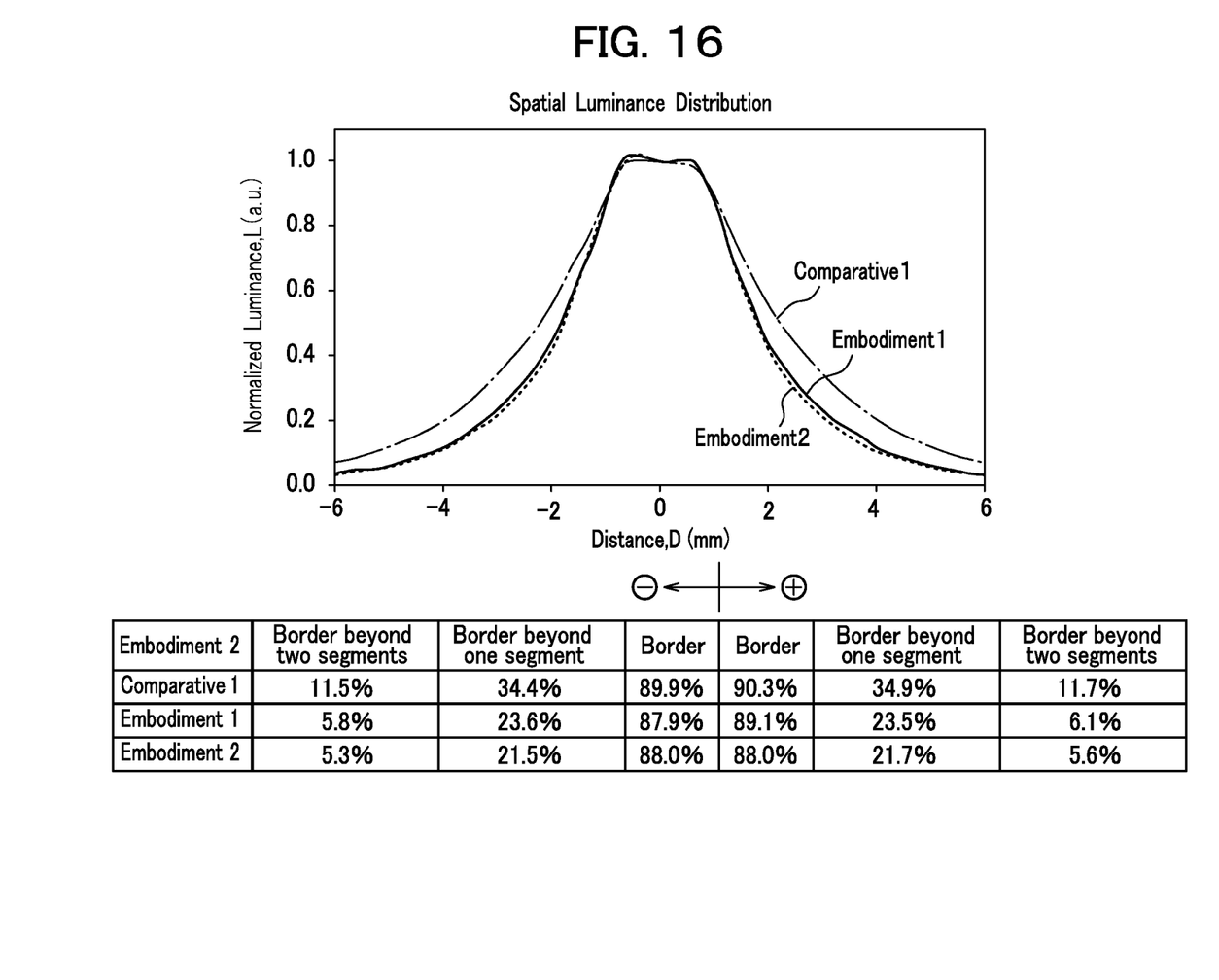
FIG. 16 is a collection of a graph and a table indicating the advantageous effects of the embodiments 1 and 2.

FIG. 16 is a collection of a graph and a table comparing the embodiments 1 and 2 with the comparative example 1 in terms of light leakage to the adjacent segments. The graph in the upper part of FIG. 16 and the table in the lower part thereof are based on the same data. In the graph in FIG. 16, the horizontal axis denotes the distances in millimeters (mm) from the central portion of a specific segment having an LED placed therein. In FIG. 16, the segment diameter is assumed to be 2 mm. The vertical axis of the graph represents relative luminance.

Matching the graph against the table in FIG. 16 reveals that "border" in the table corresponds to 1.0 or −1.0 on the horizontal axis of the graph; that "border beyond one segment" in the table corresponds to 3 or −3 on the horizontal axis of the graph; and that "border beyond two segments" in the table corresponds to 5 or −5 on the horizontal axis of the graph.

Theoretically, the luminance in the graph and table of FIG. 16 should appear symmetrical around the center of the specific segment but actually appears a little asymmetrical because of some errors. Still, the tendency can be seen. In FIG. 16, more rational comparisons are made possible by averaging the luminance values in the positive and negative directions on the horizontal axis of the graph.

In the graph of FIG. 16, the smaller the tails of the luminance distribution, the less the leakage of light to the adjacent segments. As depicted in FIG. 16, the embodiments 1 and 2 have drastically less leakage of light than the comparative example 1. In the graph of FIG. 16, the embodiments 1 and 2 manifest approximately the same effects, with the embodiment 2 exhibiting a slightly better result. This is because the honeycomb partition is arranged closer to the LEDs as the light sources in the embodiment 2 than in the embodiment 1.

The values in the table of FIG. 16 are the luminance values at the borders with the adjacent segments in the case where the luminance at the center of the specific segment is assumed to be 100. The border, the border beyond one segment, and the border beyond two segments in the table exhibit the above-described values. Although the border beyond three segments in the table corresponds to 7 or −7 on the horizontal axis of the graph, the graph does not carry the values for space reasons.

Although no light-guide plate is used in the foregoing description, the light-guide plate may be utilized as needed and the eventual advantageous effects still remain the same. Whereas the white LEDs are used in the embodiments, a combination of blue LEDs and color conversion sheets may alternatively be adopted.

As discussed above, practicing the present invention makes it possible to provide accurate and effective local dimming and to form high-contrast images. Furthermore, the use of local dimming contributes to reducing power consumption.

As many apparently different embodiments of this invention may be made without departing from the spirit and scope thereof, it is to be understood that the invention is not limited to the specific embodiments thereof except as defined in the appended claims.

What is claimed is:

1. A display apparatus comprising:
a display panel; and
a local dimming controlled backlight, wherein
the backlight has a light source and an optical sheet,
the light source has a light source substrate and a plurality of LEDs arranged on the light source substrate,
the light source is divided into a plurality of segments in planar view,
the light source substrate and the LEDs are covered with a transparent resin,
the transparent resin is overlaid with a sheet having a honeycomb partition,
the honeycomb partition forms honeycomb holes, the honeycomb holes are filled with a resin,
each segment has more than one of the honeycomb holes,
one LED of the LEDs is arranged in each of the plurality of segments and overlapped at least three of the honeycomb holes, in a plan view, and
the local dimming controlled backlight controls luminance of each of the plurality of segments by turning on and off the one LED arranged in the segment.

2. The display apparatus according to claim 1, wherein the sheet having the honeycomb partition is overlaid with a diffusion sheet.

3. The display apparatus according to claim 1, wherein the sheet having the honeycomb partition is overlaid with a plurality of diffusion sheets.

4. The display apparatus according to claim 2, wherein the diffusion sheet is overlaid with a prism sheet.

5. The display apparatus according to claim 1, wherein a diameter of a honeycomb in the honeycomb partition is larger than a diameter of a pixel in the display panel and smaller than a diameter of each of the segments.

* * * * *